(12) United States Patent
Taub et al.

(10) Patent No.: US 11,429,772 B2
(45) Date of Patent: Aug. 30, 2022

(54) METHOD AND APPARATUS FOR HIGH SPEED EYE DIAGRAM SIMULATION

(71) Applicant: Mellanox Technologies, Ltd., Yokneam (IL)

(72) Inventors: Benjamin Taub, Shvei Shomron (IL); Amit Nahmias, Kiryat Tivon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 537 days.

(21) Appl. No.: 16/561,153

(22) Filed: Sep. 5, 2019

(65) Prior Publication Data

US 2021/0073452 A1    Mar. 11, 2021

(51) Int. Cl.

| | |
|---|---|
| H04B 1/10 | (2006.01) |
| G06F 30/367 | (2020.01) |
| G06N 3/067 | (2006.01) |
| H04L 27/26 | (2006.01) |
| G06F 17/16 | (2006.01) |
| H04L 1/20 | (2006.01) |

(Continued)

(52) U.S. Cl.
CPC ............ *G06F 30/367* (2020.01); *G06F 17/16* (2013.01); *G06N 3/0675* (2013.01); *H04B 1/1027* (2013.01); *H04L 1/205* (2013.01); *H04L 27/2628* (2013.01); *G06F 2111/08* (2020.01); *H04L 25/03057* (2013.01)

(58) Field of Classification Search
CPC . H04L 25/03057; H04L 1/20; H04L 25/4917; H04L 25/0272; H04L 7/033; H04L 7/0331; H04L 1/24; H04L 25/08; H04L 25/4902; G01R 31/31709; G01R 29/26; G01R 31/3171; G01R 13/029; G01R 31/31711; G01R 31/31708; G01R 31/31922; H04B 10/2914; H04B 10/50; H04B 10/541; H04B 10/504; H04B 10/50575; H04B 10/505; H04B 10/40; H04B 10/5053
USPC ........................................................ 375/346
See application file for complete search history.

(56) References Cited

U.S. PATENT DOCUMENTS 10,547,475 B1 *    1/2020  Gagnon ............ H04L 25/03057
2015/0030062 A1 *  1/2015  Kossel .................... H04L 27/01
                                                              375/232

(Continued)

*Primary Examiner* — Eva Y Puente
(74) *Attorney, Agent, or Firm* — Moore & Van Allen PLLC

(57) ABSTRACT

Embodiments are disclosed for computing an eye diagram based on input pulse responses. An example method includes receiving a set of input pulse responses in one or more unit interval (UI) spaced samples. The set of input pulse responses is generated based on measuring a signal histogram of a receiver of a pulse amplitude modulation analog signal. The method further includes receiving a set of voltage range constraints and generating a matrix based at least in part on an element-wise trigonometric-based operation performed on one or more products of each element of the set of input pulse responses and the set of voltage range constraints. The method further includes generating an eye diagram probability density function based on the matrix and computing an eye diagram based on the eye diagram probability density function, the voltage range constraints, and time data associated with the one or more unit interval spaced samples.

18 Claims, 5 Drawing Sheets

(51) Int. Cl.
    *G06F 111/08*     (2020.01)
    *H04L 25/03*     (2006.01)

(56) References Cited

U.S. PATENT DOCUMENTS

| | | | |
|---|---|---|---|
| 2015/0162952 A1* | 6/2015 | Hollis | H04B 3/32 370/201 |
| 2020/0235830 A1* | 7/2020 | Nitsch | H04B 17/309 |

\* cited by examiner

METHOD AND APPARATUS FOR HIGH SPEED EYE DIAGRAM SIMULATION

BACKGROUND

Embodiments of the present invention relate generally to eye diagram computation in the context of signal processing. More specifically, embodiments of the present invention relate to eye diagram computation based on pulse response data.

BRIEF SUMMARY

Example embodiments described herein disclose a method and apparatuses for eye diagram computation based on pulse response data. The details of some embodiments of the subject matter described in this specification are set forth in the accompanying drawings and the description below. Other features, aspects, and advantages of the subject matter will become apparent from the description, the drawings, and the claims.

In accordance with an example embodiment, an apparatus for computing an eye diagram based on input pulse responses is provided. The apparatus includes at least one processor and at least one memory including computer program code. The at least one memory and the computer program code are configured to, with the at least one processor, cause the apparatus to at least receive a set of input pulse responses in one or more unit interval (UI) spaced samples. The set of input pulse responses is generated based on measuring a signal histogram of a receiver of a pulse amplitude modulation analog signal. The at least one memory and the computer program code are further configured to, with the at least one processor, cause the apparatus to receive a set of voltage range constraints. The at least one memory and the computer program code are further configured to, with the at least one processor, cause the apparatus to generate a matrix based at least in part on an element-wise trigonometric-based operation performed on one or more products of each element of the set of input pulse responses and the set of voltage range constraints. The at least one memory and the computer program code are further configured to, with the at least one processor, cause the apparatus to generate an eye diagram probability density function based on the matrix. The at least one memory and the computer program code are further configured to, with the at least one processor, cause the apparatus to compute an eye diagram based on the eye diagram probability density function, the voltage range constraints, and time data associated with the one or more unit interval spaced samples.

In some embodiments, the set of voltage range constraints are received in the form of a vector that includes a maximum voltage and a delta voltage defining a difference between each voltage in the vector. In some embodiments, the apparatus is caused to generate the matrix by at least defining an alpha value ($\alpha$) that equals one divided by 2 times the maximum voltage times the delta voltage. In some embodiments, the apparatus is caused to generate the matrix by at least multiplying a product of the set of input pulse responses with the set of voltages and with the alpha value and $\pi$. In some embodiments, the element-wise trigonometric-based operation includes an element-wise cosine. In some embodiments, the apparatus is caused to generate the eye diagram probability density function by at least performing an inverse Fourier transform on a columnwise product of the matrix.

In another example embodiment, a method for generating an eye diagram a set of input pulse responses is provided, the method includes receiving a set of input pulse responses in one or more unit interval (UI) spaced samples. The set of input pulse responses is generated based on measuring a signal histogram of a receiver of a pulse amplitude modulation analog signal. The method further includes receiving a set of voltage range constraints. The method further includes generating a matrix based at least in part on an element-wise trigonometric-based operation performed on one or more products of each element of the set of input pulse responses and the set of voltage range constraints. The method further includes generating an eye diagram probability density function based on the matrix. The method further includes computing an eye diagram based on the eye diagram probability density function, the voltage range constraints, and time data associated with the one or more unit interval spaced samples.

In some embodiments, the set of voltage range constraints are received in the form of a vector including a maximum voltage and a delta voltage defining a difference between each voltage in the vector. In some embodiments, generating the matrix includes defining an alpha value ($\alpha$) that equals one divided by 2 times the maximum voltage times the delta voltage. In some embodiments, generating the matrix further includes multiplying a product of the set of input pulse responses with the set of voltages and with the alpha value and $\pi$. In some embodiments, the element-wise trigonometric-based operation comprises an element-wise cosine. In some embodiments, generating the eye diagram probability density function based on the matrix includes performing an inverse Fourier transform on a columnwise product of the matrix.

In another example embodiment, a computer program product including at least one non-transitory computer-readable storage medium having computer executable program code instructions stored therein is provided. The computer executable program code instructions includes program code instructions configured, upon execution, to receive a set of input pulse responses in one or more unit interval (UI) spaced samples. The set of input pulse responses is generated based on measuring a signal histogram of a receiver of a pulse amplitude modulation analog signal. The computer executable program code instructions further include program code instructions configured, upon execution, to receive a set of voltage range constraints. The computer executable program code instructions further include program code instructions configured, upon execution, to generate a matrix based at least in part on an element-wise trigonometric-based operation performed on one or more products of each element of the set of input pulse responses and the set of voltage range constraints. The computer executable program code instructions further include program code instructions configured, upon execution, to generate an eye diagram probability density function based on the matrix. The computer executable program code instructions further include program code instructions configured, upon execution, to compute an eye diagram based on the eye diagram probability density function, the voltage range constraints, and time data associated with the one or more unit interval spaced samples.

In some embodiments, the set of voltage range constraints are received in the form of a vector comprising a maximum voltage, and a delta voltage defining a difference between each voltage in the vector. In some embodiments, the computer executable program code instructions further include program code instructions configured, upon execution, to generate the matrix by at least defining an alpha value (α) that equals one divided by 2 times the maximum voltage times the delta voltage. In some embodiments, the computer executable program code instructions further include program code instructions configured, upon execution, to generate the matrix by at least multiplying a product of the set of input pulse responses with the set of voltages and with the alpha value and π. In some embodiments, the element-wise trigonometric-based operation comprises an element-wise cosine. In some embodiments, the computer executable program code instructions further include program code instructions configured, upon execution, to generate the eye diagram probability density function based on the matrix by performing an inverse Fourier transform on a columnwise product of the matrix.

BRIEF DESCRIPTION OF THE DRAWINGS

Figure 1A:
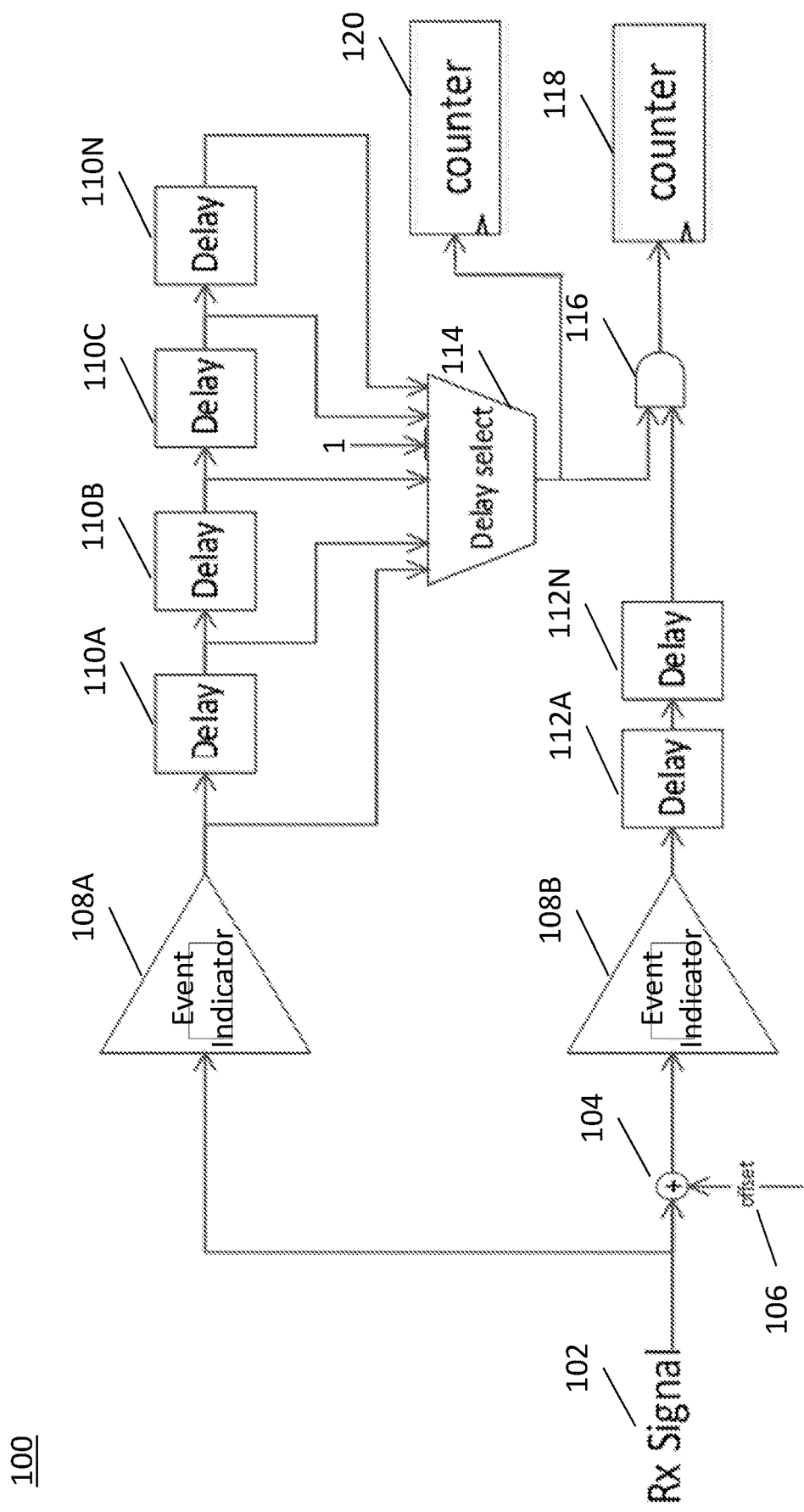
Figure 1B:
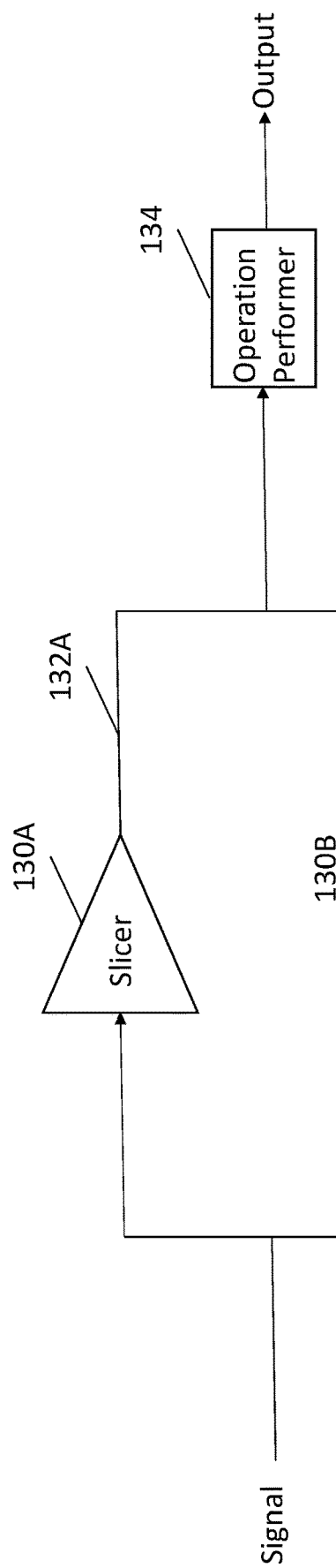
Figure 2:
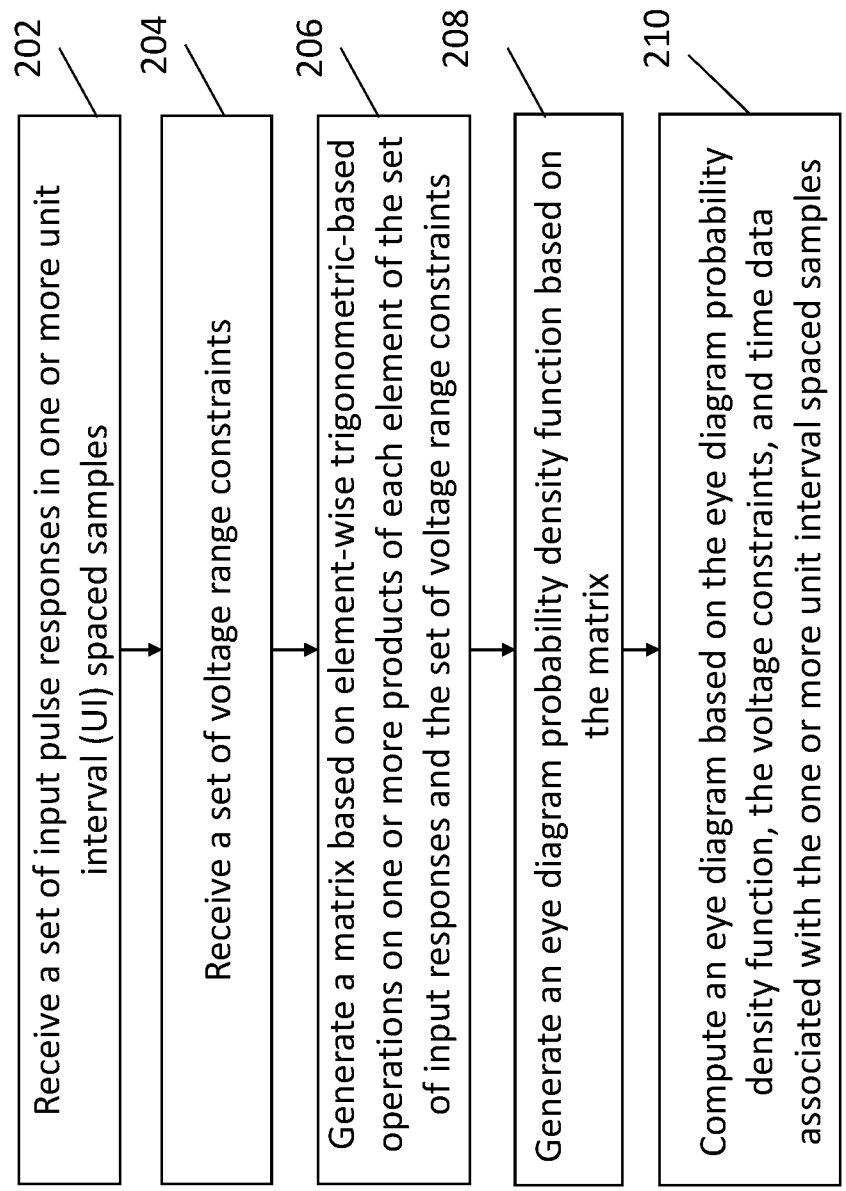
Figure 3:
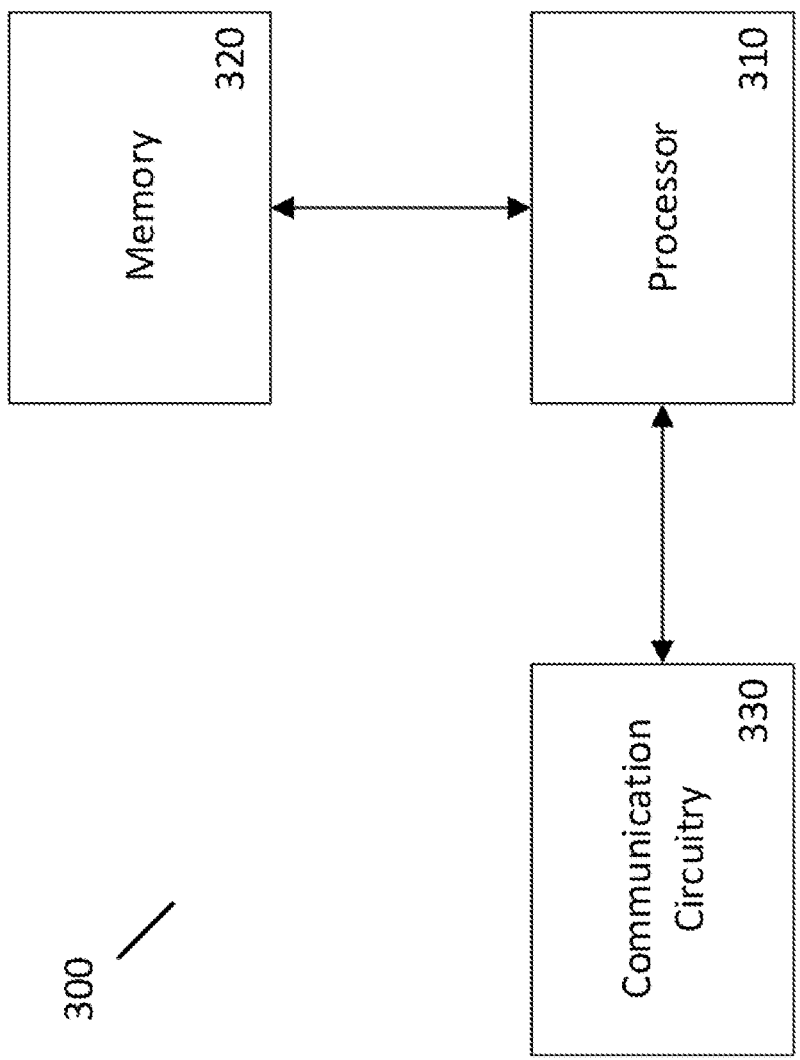
Figure 4:
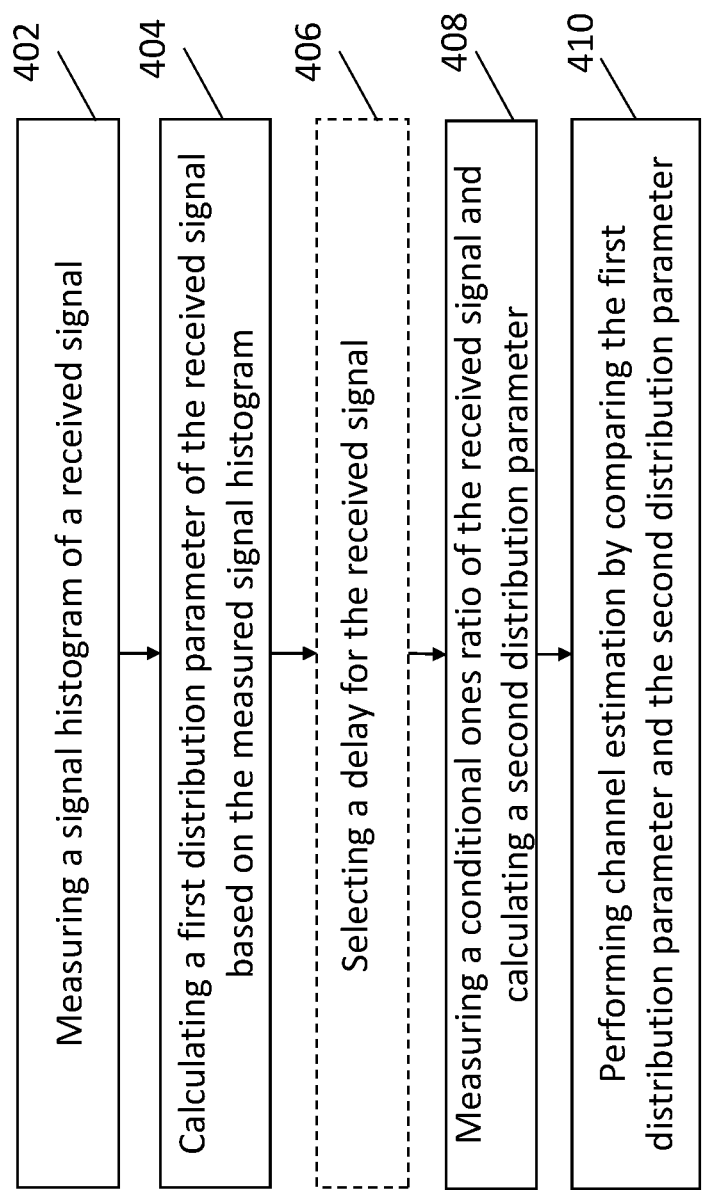

Having thus described the invention in general terms, reference will now be made to the accompanying drawings, which are not necessarily drawn to scale, and wherein:

FIG. 1A illustrates an analog conditional one counting circuit according to example embodiments of the present invention;

FIG. 1B illustrates an event indicator according to example embodiments of the present invention;

FIG. 2 is a flowchart illustrating an example method of operation for computing an eye diagram according to example embodiments of the present invention;

FIG. 3 illustrates an example computing system that may be embedded in the communication system; and FIG. 4 is flowchart illustrating another example method of operation of a communication system embedded with a receiver having an analog conditional one counting circuit according to example embodiments of the present invention.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The term "exemplary," as may be used herein, is not provided to convey any qualitative assessment, but instead merely to convey an illustration of an example. Thus, use of any such terms should not be taken to limit the spirit and scope of embodiments of the present invention.

Electrical/optical communication systems generally include a transmitter, a receiver, and a channel. The transmitter generates a signal conveying information, which, after being transmitted over a channel, is received and recovered at the receiver. The signal conveying information can be encoded in various ways, such as via pulse-amplitude modulation (PAM), quadrature amplitude modulation, or the like. The signal being transmitted by the transmitter may be a series of symbols with different amplitudes representing data in a defined timing.

In the real world, transmission channels are non-ideal and introduce various unwanted effects that cause distortion of the signals, making the communication less reliable. For example, the channel may have a transfer function that introduces changes in the signal transmitted in the form of amplitude and/or phase changes. These changes distort the signal received at the receiver. Moreover, during transmission, inter-symbol interference ("ISI") may occur. ISI is a form of distortion of a signal in which one symbol interferes with subsequent symbols. The presence of ISI makes the communication less reliable. The channel may distort the signal in many ways, and all these unwanted effects can distort the signal in the transmission process. Equalizers at the receiver may be used to try to compensate for these unwanted effects.

A serializer/deserializer (SerDes) is a pair of functional blocks that generally converts data between serial data and parallel interfaces in each direction in a communication system. SerDes is used in highspeed communication systems to decrease the number of input/output (IO) pins and interconnects. Various parameters of a SerDes, such as vertical and horizontal sampling (or slicing) offsets and/or gain may require fine-tuning in the design stage to achieve desirable result, such as low bit error rate (BER) overall in the communication system. In designing such a SerDes, data contained in an eye diagram of the signal can be very important. An eye diagram is a representation of a signal that allows key parameters of a signal to be quickly visualized and determined. A simulated eye diagram may be used for fine-tuning parameters while designing a SerDes.

In simulating SerDes links while designing, a single pulse of a signal representing a single UI symbol may be utilized. The single pulse of the signal may be passed through a channel and equalizer and may be used to compute actually received data after being affected by the unwanted effects introduced by the channel and compensated by equalizers.

The single pulse of the signal may be used to build a simulated eye diagram: statistical or probabilistic. The statistical method involves convoluting the pulse response with data and overlaying it on itself. The statistical method is highly limited because the data convoluted with the pulse response only contains a small fraction of possible transitions and does not accurately reflect the BER. The probabilistic method may be able to create an eye diagram that more accurately reflects BER for any length of signal by taking all possible transitions into account. Currently, building a probabilistic eye diagram from a pulse response is doable both for simulations and for actual hardware; however, the conventional method of building a probabilistic eye diagram requires repeatedly convoluting the voltage cursors with each other, which is inefficient and slow. Due to computation and memory constraints, this conventional method becomes nearly impossible to use for simulating an eye diagram that is large enough to capture multiple reflections.

Example embodiments described herein disclose a method and apparatuses for computing diagrams in a much more efficient way. Some embodiments take advantage of the concept of a "conditional ones ratio." The content of U.S. application Ser. No. 16/511,771, which relate to conditional ones ratios, is incorporated by reference in the present application. Example embodiments may also be implemented on a device for with a SerDes to monitor performance of the SerDes.

FIG. 1A illustrates an analog conditional one counting circuit according to example embodiments of the present invention. Embodiments of the analog conditional one counting circuit 100 may be utilized to measure conditional ones.

In some embodiments, the conditional one counting circuit comprises an offset unit 104, a first event indicator 108A and a second event indicator 108B, a first set of one or more delay circuit units 110A to 110N, a second set of delay circuit units 112A to 112N, a multiplexer 114 serving as a delay select, an AND gate 116, a counter 118, and optionally a second counter 120. The conditional one counting circuit may be embedded in a receiver of a communication system and may receive a received signal 102 as an input. An event indicator is a circuit configured to slice an input signal to detect a defined state of an input signal. In some embodiments, the defined state may be a pre-defined signal level of the input signal of the event indicator.

The structure of an example event indicator, such as the event indicators 108A, 108B of FIG. 1A, is illustrated in FIG. 1B. As illustrated in FIG. 1B, the event indicator may comprise two slicers 130A and 130B configured to slice an input signal of the event indicator. Each of the slicers 130A and 130B may slice a pre-defined level of the input signal and generate an output 132A and 132B. The output 132A and 132B may be subsequently fed into an operation performer circuit 134. In various embodiments, the operation performer circuit may be configured to output one of the following: 132A, 132B, the inverse of 132A, the inverse of 132B, and the result of an operation based 132A and 132B, such as the XOR of 132A and 132B.

Turning again to FIG. 1A, the first event indicator 108A may be configured to receive an input signal, such as the received signal 102, as input to generate a sliced input signal. The offset unit 104 may be configured to apply an offset 106 to the received signal 102 to generate an offsetted signal. In some embodiments, the offset may be a predefined direct current offset. In some embodiments, the predefined direct current offset may be adjustable.

In some embodiments, the second event indicator 108B may be configured to receive an offsetted signal of the input signal, such as the received signal 102, as an input for generating a sliced offsetted signal. The first set of delay circuit units 110A to 110N may be configured to generate one or more delayed signals based on the sliced input signal. The first delay circuit unit 110A in the first set of delay circuit units 110A to 110N may receive the sliced input signal as input and generate a delayed signal, then feed the delayed signal to the next delay circuit unit 110B in the first set of delay circuit units 110A to 110N. The next delay circuit unit 110B may in turn generate another delayed signal, then feed the delayed signal to the next delay circuit unit 110C in the first set of delay circuit units 110A to 110N. The number of the delay circuit units in the first set of delay circuit units 110A to 110N may be customizable and may correspond with the number of the one or more delayed signals.

The one or more delayed signals may be fed into the multiplexer 114, along with an optional constant 1 signal. The multiplexer 114 may be configured to multiplex the one or more delayed signals and, optionally, the constant 1 signal. In some embodiments, the multiplexer 114 may effectively serve as a delay select module for the one or more delayed signals. The multiplexer 114 may be set according to a channel phase measurement to be performed.

The second set of delay circuit units may be configured to receive the sliced offsetted signal as input and generate a delayed offsetted signal based on the sliced offsetted signal. The first delay circuit unit 112A in the second set of delay circuit units 112A to 112N may receive the sliced offsetted signal as input and generate a delayed signal, then feed the delayed signal to the next delay circuit unit in the second set of delay circuit units 112A to 112N. The output of the last delay circuit unit in the second set of delay circuit units 112A to 112N is the delayed offsetted signal. The number of the delay circuit units in the second set of delay circuit units 112A to 112N may be customizable.

The AND gate 116 may be configured to receive the output of the multiplexer and the delayed offsetted signal as input. The output of the AND gate may be fed into the counter 118 to count the output of the AND gate. In some embodiments, the counter 118 may be configured to count the output of the AND gate for a predefined period of time. In some embodiments, the second counter 120 may be the same counter as the counter 118 by introducing additional logic circuits in the analog conditional one counting circuit.

FIG. 2 is a flowchart illustrating an example method for computing an eye diagram based on input pulse responses performed by a computing system 300. On a high level, the method is based on utilizing the pulse responses generated based on measuring a signal diagram. The following is a theorem of Fourier transform:

$$x*y = \mathcal{F}^{-1}\{\mathcal{F}\{x\} \cdot \mathcal{F}\{y\}\}$$

In the equation above, * is a convolution operation and $\mathcal{F}$ and $\mathcal{F}^{-1}$ are the Fourier and inverse Fourier transforms, respectively. In some embodiments of the method, the Fourier transforms are not computed but rather are directly generated, resulting in much faster simulation of an eye diagram and better support for parallelization (which, in turn, can result in even faster simulation).

In some embodiments, at operation 202, the computing system 300 is configured to receive a set of input pulse responses in one or more unit interval (UI) spaced samples, where UI represents time. In some embodiments, the set of input pulse responses is generated based on measuring a signal histogram for a signal received by a receiver of a pulse amplitude modulation-N signal, such as a PAM-4 or non-return to zero analog signal. In some embodiments, the set of input pulse responses may be pulse responses deduced based on conditional ones ratio, which is detailed later in conjunction with FIG. 4. The set of input pulse responses may be received in a vector form and may be denoted by $\vec{x}$. In some embodiments, the set of input pulse responses are received from a receiver implemented with an analog conditional one counting circuit 100.

In some embodiments, at operation 204, the computing system 300 is configured to receive a set of voltage range constraints. In some embodiments, the set of voltage range constraints are received in the form of a vector $\vec{v}$ comprising a maximum voltage (Vmax), and a delta voltage (ΔV) defining a difference between each voltage in the vector. In some embodiments, $\vec{v} = -V_{max}:\Delta V:V_{max}$.

In some embodiments, at operation 206, the computing system 300 is configured to generate a matrix based at least in part on an element-wise trigonometric-based operation performed on one or more products of each element of the set of input pulse responses and the set of voltage range constraints. In some embodiments, generating the matrix comprises defining an alpha value (α) that equals one divided by 2 times the maximum voltage times the delta voltage, expressed as $$\alpha = \frac{1}{2 \cdot V_{max} \cdot \Delta V}.$$

In some embodiments, generating the matrix further comprises multiplying a product of the set of input pulse responses with the set of voltages and with the alpha value and π, expressed as $\alpha\pi[\vec{x}\vec{v}^T]$. In some embodiments, the element-wise trigonometric-based operation is an element-wise cosine. Therefore, if the matrix is denoted by P, the matrix may be expressed as $P=\cos(\alpha\pi[\vec{x}\vec{v}^T])$.

In some embodiments, at operation 208, the computing system 300 is configured to generate an eye diagram probability density function based on the matrix. In some embodiments, generating the eye diagram probability density function based on the matrix comprises performing an inverse Fourier transform on a columnwise product of the matrix, such as: represented $$\vec{p}^T = V_{\substack{columnwise\\product}} P$$

and $\vec{E} = \mathcal{F}^{-1}\{\vec{p}\}$, where $\vec{E}$ is the eye diagram probability product density function.

In some embodiments, at operation 210, the computing system 300 is configured to compute an eye diagram based on the eye diagram probability density function, the voltage range constraints, and time data associated with the one or more unit interval spaced samples. In some embodiments, the eye diagram is used by the computing system 300 or another computing system to monitor the performance of the receiver embedded with the analog conditional one counting circuit 100. In some embodiments, the eye diagram may be outputted by the computing system 300 to another computing system that monitors the performance of the receiver embedded with the analog conditional one counting circuit 100.

FIG. 3 illustrates an example computing system 300 that may be utilized to perform the example method illustrated herein. The computing system 300 may be used for computing an eye diagram based on input pulse responses. The computing system 300 may include or otherwise be in communication with a processor 310, memory circuitry 320, and communication circuitry 330. In some embodiments, the processor 310 (which may include multiple or co-processors or any other processing circuitry associated with the processor) may be in communication with the memory circuitry 320. The memory circuitry 320 may comprise non-transitory memory circuitry and may include one or more volatile and/or non-volatile memories. In some examples, the memory circuitry 320 may be an electronic storage device (e.g., a computer readable storage medium) configured to store data that may be retrievable by the processor 310. In some examples, the data stored in the memory 320 may include pulse responses, voltage range constraints, conditional ones ratio, or the like for enabling the apparatus to carry out various functions or methods in accordance with embodiments of the present invention, described herein.

In some examples, the processor 310 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 310 may also be embodied on various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading. In some embodiments, the processor 310 is a microprocessor.

In an example embodiment, the processor 310 may be configured to execute instructions, such as computer program code or instructions, stored in the memory circuitry 320 or otherwise accessible to the processor 310. Alternatively or additionally, the processor 310 may be configured to execute hard-coded functionality. As such, whether configured by hardware or software instructions, or by a combination thereof, the processor 310 may represent a computing entity (e.g., physically embodied in circuitry) configured to perform operations according to an embodiment of the present invention described herein. For example, when the processor 310 is embodied as an ASIC, FPGA, or similar, the processor may be configured as hardware for conducting the operations of an embodiment of the invention. Alternatively, when the processor 310 is embodied to execute software or computer program instructions, the instructions may specifically configure the processor 310 to perform the algorithms and/or operations described herein when the instructions are executed. However, in some cases, the processor 310 may be a processor of a device specifically configured to employ an embodiment of the present invention by further configuration of the processor by instructions for performing the algorithms and/or operations described herein. The processor 310 may further include a clock, an arithmetic logic unit (ALU) and logic gates configured to support operation of the processor 310, among other things.

The computing system 300 may optionally also include the communication circuitry 330. The communication circuitry may be any means embodied in either hardware or a combination of hardware and software that is configured to receive and/or transmit data from/to a network and/or any other device or module in communication with the computing system 300. In this regard, the communication interface may include, for example, supporting hardware and/or software for enabling communications. As such, for example, the communication circuitry 330 may include a communication modem and/or other hardware/software for supporting communication via cable, universal serial bus (USB), integrated circuit receiver, or other mechanisms.

FIG. 4 is a flowchart illustrating an example method of operation of a communication system embedded in a receiver having an analog conditional one counting circuit according to example embodiments of the present invention. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 4 may be performed by the analog conditional one counting circuit illustrated in FIG. 1A and the computing system 300 illustrated in FIG. 3.

In some embodiments, at operation 402, the communication system measures a signal histogram of a received signal. In some embodiments, the received signal may be the received signal previously described in conjunction with FIGS. 1 and 2. In some embodiments, the communication system utilizes the analog conditional one counting circuit described in conjunction with FIG. 1A to measure the signal histogram. In some embodiments, the received signal encodes information in a plurality of bits. In some embodiments, the received signal is a PAM-4 signal.

In some embodiments, at operation 404, the communication system calculates a first distribution of the received signal based on the measured signal histogram. In some embodiments, the communication system may utilize the computing system 300 described in conjunction with FIG. 3 to perform the calculation of the first distribution parameter. A distribution parameter may take the form of a median, a statistic on a cut-off on a defined percentage, such as 25%, 50%, 75%, or the like, or other statistics deducible from measured histograms, ones ratios, or conditional ones ratios.

In some embodiments, at optional operation 406, the communication system selects a delay for the received signal. In some embodiments, the communication system selects the delay for the received signal according to a channel phase measurement to be performed. In some embodiments, the communication system may select the delay for the received signal by utilizing the multiplexer 114 described in conjunction with FIG. 1A.

In some embodiments, at operation 408, the communication system measures a conditional ones ratio of the received signal and calculates a second distribution parameter based on the conditional ones ratio measured. In some embodiments, the communication system may utilize the computing system 300 described in conjunction with FIG. 3 to perform the calculation of the second distribution parameter.

In some embodiments, at operation 410, the communication system may perform channel estimation to generate impulse response/pulse response by comparing the first distribution parameter and the second distribution parameter measured. By comparing the first distribution parameter and the second distribution parameter measured, the communication system may be able to deduce the impulse response/pulse response of the channel. By measuring the histogram of an incoming signal and then measuring the conditional ones ratio, the communication system can enable measurement of the signal histogram under different conditions. Dependency between the signal and the conditions defined may be deduced by comparing differences in the distribution parameters of the signal histogram in different conditions. Such dependency may be used to derive the channel impulse response/pulse response.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for computing an eye diagram based on input pulse responses comprising at least one processor and at least one memory including computer program code, the at least one memory and the computer program code configured to, with the at least one processor, cause the apparatus to at least:
receive a set of input pulse responses in one or more unit interval (UI) spaced samples, wherein the set of input pulse responses is generated based on measuring a signal histogram of a receiver of a pulse amplitude modulation analog signal;
receive a set of voltage range constraints;
generate a matrix based at least in part on an element-wise trigonometric-based operation performed on one or more products of each element of the set of input pulse responses and the set of voltage range constraints;
generate an eye diagram probability density function based on the matrix; and
compute an eye diagram based on the eye diagram probability density function, the voltage range constraints, and time data associated with the one or more unit interval spaced samples.

2. The apparatus of claim 1, wherein the set of voltage range constraints are received in the form of a vector comprising a maximum voltage and a delta voltage defining a difference between each voltage in the vector.

3. The apparatus of claim 2, wherein the apparatus is caused to generate the matrix by at least defining an alpha value ($\alpha$) that equals one divided by 2 times the maximum voltage times the delta voltage.

4. The apparatus of claim 3, wherein the apparatus is caused to generate the matrix by at least multiplying a product of the set of input pulse responses with the set of voltages and with the alpha value and $\pi$.

5. The apparatus of claim 4, wherein the element-wise trigonometric-based operation comprises an element-wise cosine.

6. The apparatus of claim 5, wherein the apparatus is caused to generate the eye diagram probability density function by at least performing an inverse Fourier transform on a columnwise product of the matrix.

7. A method for generating an eye diagram based on a set of input pulse responses, the method comprising:
receiving a set of input pulse responses in one or more unit interval (UI) spaced samples wherein the set of input pulse responses is generated based on measuring a signal histogram of a receiver of a pulse amplitude modulation analog signal;
receiving a set of voltage range constraints;
generating a matrix based at least in part on an element-wise trigonometric-based operation performed on one or more products of each element of the set of input pulse responses and the set of voltage range constraints;
generating an eye diagram probability density function based on the matrix; and
computing an eye diagram based on the eye diagram probability density function, the voltage range constraints, and time data associated with the one or more unit interval spaced samples.

8. The method of claim 7, wherein the set of voltage range constraints are received in the form of a vector comprising a maximum voltage and a delta voltage defining a difference between each voltage in the vector.

9. The method of claim 8, wherein generating the matrix comprises defining an alpha value (α) that equals one divided by 2 times the maximum voltage times the delta voltage.

10. The method of claim 9, wherein generating the matrix further comprises multiplying a product of the set of input pulse responses with the set of voltages and with the alpha value and π.

11. The method of claim 10, wherein the element-wise trigonometric-based operation comprises an element-wise cosine.

12. The method of claim 11, wherein generating the eye diagram probability density function based on the matrix comprises performing an inverse Fourier transform on a columnwise product of the matrix.

13. A computer program product comprising at least one non-transitory computer-readable storage medium having computer executable program code instructions stored therein, the computer executable program code instructions comprising program code instructions configured, upon execution, to:
receive a set of input pulse responses in one or more unit interval (UI) spaced samples wherein the set of input pulse responses is generated based on measuring a signal histogram of a receiver of a pulse amplitude modulation analog signal;
receive a set of voltage range constraints;
generate a matrix based at least in part on an element-wise trigonometric-based operation performed on one or more products of each element of the set of input pulse responses and the set of voltage range constraints;
generate an eye diagram probability density function based on the matrix; and
compute an eye diagram based on the eye diagram probability density function, the voltage range constraints, and time data associated with the one or more unit interval spaced samples.

14. The computer program product of claim 13, wherein the set of voltage range constraints are received in the form of a vector comprising a maximum voltage, and a delta voltage defining a difference between each voltage in the vector.

15. The computer program product of claim 14, wherein the computer executable program code instructions further comprise program code instructions configured, upon execution, to generate the matrix by at least defining an alpha value (α) that equals one divided by 2 times the maximum voltage times the delta voltage.

16. The computer program product of claim 15, wherein the computer executable program code instructions further comprise program code instructions configured, upon execution, to generate the matrix by at least multiplying a product of the set of input pulse responses with the set of voltages and with the alpha value and π.

17. The computer program product of claim 16, wherein the element-wise trigonometric-based operation comprises an element-wise cosine.

18. The computer program product of claim 17, wherein the computer executable program code instructions further comprise program code instructions configured, upon execution, to generate the eye diagram probability density function based on the matrix by performing an inverse Fourier transform on a columnwise product of the matrix.

* * * * *